United States Patent [19]

Trivette, Jr.

[11] Patent Number: 4,493,925

[45] Date of Patent: Jan. 15, 1985

[54] RUBBER COMPOSITIONS AND METHOD FOR TREATING RUBBER WITH HYDROXYMETHYL SULFINIC SALTS

[75] Inventor: Chester D. Trivette, Jr., Akron, Ohio

[73] Assignee: Monsanto Company, St. Louis, Mo.

[21] Appl. No.: 409,786

[22] Filed: Aug. 20, 1982

[51] Int. Cl.$^3$ .................. C08C 4/00; C08C 19/20
[52] U.S. Cl. ............................... 525/353; 524/426; 524/445; 524/451; 524/492; 524/495; 525/332.6; 525/331.9; 525/333.1
[58] Field of Search ............. 525/344, 353, 333.1

[56] References Cited

U.S. PATENT DOCUMENTS

| | | | |
|---|---|---|---|
| 3,644,582 | 2/1972 | Knaack | 525/279 |
| 3,712,934 | 1/1973 | Kiuchi | 525/309 |
| 4,096,135 | 6/1978 | Ohishi | 526/337 |

Primary Examiner—C. A. Henderson
Attorney, Agent, or Firm—Gordon B. Seward

[57] ABSTRACT

Rubber compositions are shown comprising diene rubber and salts of hydroxymethylsulfinic acid which exhibit improved green strength and/or tack properties. Treatment of diene rubber above 130° C. with the same salts is shown to be effective in obtaining rubber compositions of improved properties.

37 Claims, No Drawings

RUBBER COMPOSITIONS AND METHOD FOR TREATING RUBBER WITH HYDROXYMETHYL SULFINIC SALTS

BACKGROUND OF THE INVENTION

This invention relates to improved diene rubber compositions and to a method of treating diene rubber with salts of hydroxymethylsulfinic acid. The treatment is especially effective in increasing the tack and green strength of the diene rubber.

The introduction of synthetic diene rubber as a total or partial replacement for natural rubber in portions of pneumatic tires and other rubber articles presented problems in that the behavior of the synthetic materials differed from that of natural rubber. One significant area of difference concerned tack and green strength. Typically, unvulcanized synthetic diene rubber has significantly lower green strength and tack properties than does natural rubber. This difference has presented problems in that articles such as tires failed to maintain their structural integrity during handling and shaping prior to vulcanization. As a result, searching for improvements in the green strength and tack of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength and tack. Thus, much of the effort torward green strength and tack improvement concerns synthetic polyisoprene. Other synthetic diene rubbers which are widely used are polybutadiene and styrene-butadiene copolymer rubber (SBR).

Efforts to increase the tack and green strength of diene rubber include a variety of treatments such as the addition of a wide variety of resin tackifiers to synthetic rubber compounds. In general, these materials have been ineffective for the desired purpose, primarily because of the inherently lower green strength of the synthetic rubber polymers. U.S. Pat. Nos. 3,151,161 and 3,225,100 teach incorporation of nitrosoanilinoalkanes into rubber, and improvements in green strength have been realized in synthetic rubber thus treated. Problems of dispersion of these materials into rubber have been encountered, compounded by the fact that relatively low amounts are generally used.

SUMMARY OF THE INVENTION

It is an object of this invention to provide compositions comprising diene rubber which exhibit improved properties of green strength or tack, or both. It is another object of this invention to provide a method of treating diene rubber to improve its green strength or tack properties.

These and other objects are realized in the instant invention, first in a composition comprising diene rubber containing a modifying amount of a salt of hydroxymethylsulfinic acid.

The invention also includes a method of treating diene rubber which comprises treating the diene rubber at an appropriate temperature above 130° C. for a long enough time to impart to the diene rubber improved properties as to green strength or tack, with a salt of hydroxymethylsulfinic acid. The invention also includes the product of the above-described method.

The composition of the invention is described as comprising diene rubber. By diene rubber is meant an elastomer which is a polymer from diene monomer, either a natural or synthetic polymer, including mixtures of two or more natural or synthetic polymers. Natural diene rubber includes Hevea rubber, in the form of smoked sheet, crepe or other typical forms, guayule, and other naturally occurring elastomers. Synthetic polymers which are included in the definition of "diene rubber" include polymers from isoprene and butadiene, either homopolymers or copolymers with one or more co-monomers, which can be dienes or other polymerizable materials. For example, copolymers of isoprene or butadiene with styrene, acrylonitrile, isobutylene, or unsaturated carboxy acids and esters such as maleic, fumaric, itaconic, acrylic and methacrylic acids, and methylmethacrylates are included. EPDM rubbers (polymer from ethylene, propylene and a non-conjugated diene monomer) are also included. The invention finds a particular usefulness in use with synthetic polyisoprene of a high cis-1,4 content, and blends thereof with polybutadiene rubber (BR) or styrene/butadiene copolymer rubber (SBR). In addition to the diene types mentioned, the composition can contain other compatible rubber materials and the rubber compounding ingredients normally incorporated into rubber compounds.

The modifying materials present in the composition are salts of hydroxymethylsulfinic acid. Preferred are the salts of a metal ion, especially the alkali metal, calcium, magnesium or zinc salts. Most preferred is the sodium salt, often present as a dihydrate and known also as sodium formaldehyde sulfoxylate. A mixture of two or more of the salts can be employed. The salt of hydroxymethylsulfinic acid is present in the composition of the invention in modifying amount. This amount can vary depending on the particular type of diene rubber present, the time and temperature used, the desired improvement, and other factors. Preferably, the amount of the salt present is from 0.1 to 15 parts, and more preferably 0.25 to 8 parts, and most preferably from 0.5 to 5 parts, by weight per 100 parts of diene rubber by weight. Optimum levels can easily be determined by a few simple experiments.

In the method of the invention the diene rubber, as defined above, is said to be "treated". Treatment of the diene rubber means incorporating the salt, as defined above, into the rubber, with good dispersion, and maintaining the mixture at the appropriate temperature (above 130° C.) for sufficient time to permit modification to occur. A convenient method of treating rubber involves admixture of the salt into the rubber using the type of high-shear equipment normally used for mixing rubber compounds, such as rubber mills, and, preferably, internal mixers exemplified by Banbury mixers and the like. Such mixing produces a temperature rise in the rubber mixture which can be controlled within the desired temperature range. Alternatively, the salt can be incorporated into the diene rubber at a relatively low temperature (below 130° C.) and then the mixture can be heated to the appropriate higher temperature and held for the required time.

Teatment temperatures must exceed 130° C. or the desired improvements are not realized. Preferably, temperatures above 150° are used, more preferably above 160° and most preferably between 160° and 210° C.

Preferably, the treatment time will be from 0.1 to 20 minutes, more preferably between 0.5 and 15 minutes and most preferably between 1 and 10 minutes. Shorter treatment times than the preferred minimum can result in insufficient improvement in the desired properties, and longer treatment times than the preferred maximum can be harmful to the rubber. As with the level of the salt, both optimum times and optimum temperatures for a specific rubber compound can easily be determined by a limited number of experiments.

Other rubber compounding ingredients can optionally be present during the treatment, and the presence of carbon black and/or non-black fillers is preferred. Because of the conditions employed, however, the complete vulcanization system is preferably not present during the treatment, as it could result in a premature curing or scorch of the diene rubber compound. If it is desired to have non-black fillers present in the diene rubber compound, particular advantage is realized by having the fillers present during the treatment step. It has been found that this method produces interaction between the non-black filler and the diene rubber so that better properties are obtained in the vulcanized compounds. These better physical properties are evidenced in improvements in stress-strain properties, among other properties.

Often, when treating the diene rubber, amounts of the salt will be substantially less than the maximum preferred levels set forth above, such as, for example, less than three parts by weight per 100 parts of diene rubber by weight, however, higher amounts can be employed, especially if a "masterbatch" technique is used. This technique can involve treating only a portion of diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the treating equipment, thus allowing higher throughput of rubber.

As mentioned above, the improvement of tack and green strength is of great practical importance. The nature of these two properties in uncured rubber compounds has been explored by a number of investigators. A review of recent developments was recently published, written by G. R. Hamed of the University of Akron, entitled "Tack and Green Strength of Elastomeric Materials", Rubber Chemistry and Technology, 54, pp. 576–595 (1981). This review brings out the basic fact that tack and green strength are interrelated. Tack has been defined as the ability of two materials to resist separation after bringing their surfaces into contact for a short time under a light pressure. Green strength in an elastomer is its resistance, before vulcanization, to deformation or fracture. Green strength can be determined independently, but tack is dependent to a certain degree on green strength.

DETAILED DESCRIPTION

A more complete understanding of the invention may be realized by reference to the following examples, in which all parts are by weight, unless otherwise specified.

Green strength measurements are performed using a standard tensile testing machine. Samples of the stock to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress recorded at desired levels of elongation up to 1200%, or break. Stress values are calculated based on the original cross-section area of each specimen; and the ultimate elongation value is also recorded.

Tack measurements are made using the Monsanto Tel-Tak instrument, as described in an article by J. R. Beatty in Rubber Chemistry and Technology, vol. 42, No. 4, 1040 (1969). Fabric-backed rubber specimens are cut to a width of 6.35 mm and placed at right angles with each other to give a contact area of 0.403 cm.$^2$. A contact pressure of 227 grams is used for all tests, with a 30-second dwell time. Sample "stickiness" is measured by substituting a polished stainless steel surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Cure characteristics are determined at the designated temperatures by means of the Monsanto Oscillating Disk Rheometer which is described by Decker, Wise and Guerry in Rubber World, December 1962, page 68. From the rheometer data, the minimum torque, R min., and the maximum torque, R max are recorded. The increase in torque is a measure of the degree of vulcanization and is proportional to the cross-link density. The time, $t_2$, minutes for a rise of two rheometer units above the minimum reading of the rubber sample and the time, $t_{90}$, required to obtain a torque of 90% of the maximum is recorded. The difference, $t_{90}-t_2$, is a measure of the cure rate of the sample. Vulcanizates are prepared by press curing at the selected temperature for the time indicated by the rheometer data to obtain optimum cure. The stress-strain properties of the vulcanizates are measured by conventional methods, as set forth in ASTM D412.

EXAMPLE I

The sodium salt of hydroxymethylsulfinic acid is combined in masterbatches as shown in Table I based on Natsyn 2200, a synthetic polyisoprene rubber, and the masterbatches are mixed and masticated in a laboratory Banbury mixer according to the following schedule:

1. Charge rubber and test compounds; mix 1 minute, controlling temperature between 150° and 154° C.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature should be 170°–200° C.

Masterbatch A is a control with no treating agent. Masterbatch B contains a known treating agent, N-(2-methyl-2-nitropropyl)-4-nitrosoaniline, NITROL ®, (33% on a carrier) used at its recommended level. The antidegradant used in all cases is N-(1,3-dimethylbutyl)-N'-phenyl-p-phenylenediamine.

TABLE I

| Masterbatch | A | B | C | D |
|---|---|---|---|---|
| Polymer | | | | |
| Natsyn 2200 | 100.0 | → | → | → |
| Test Compounds | | | | |
| NITROL + Clay | — | 0.75 | — | — |
| Sodium Formaldehyde Sulfoxylate | — | — | 1.0 | 2.0 |
| Other Ingredients | | | | |
| N-330 Carbon Black | 50.0 | → | → | → |
| Circosol 4240 Oil | 5.0 | → | → | → |
| Zinc Oxide | 5.0 | → | → | → |
| Stearic Acid | 2.0 | → | → | → |
| Antidegradant | 2.0 | → | → | → |
| Green Strength @ R.T., MPa Stress At: | | | | |
| 100% | 0.32 | 0.35 | 0.45 | 0.49 |
| 300% | 0.23 | 0.55 | 0.65 | 1.05 |
| 400% | 0.23 | 0.90 | 0.85 | 1.45 |
| U.E., % | 1075 | 510 | 540 | 420 |
| Tack, Monsanto Tel-Tak | | | | |
| Tack | 47 | 78 | 70 | 81 |
| Stickiness | 15 | 17 | 13 | 13 |
| "True" Tack | 32 | 61 | 57 | 68 |

This data in Table I show that the salt is effective in substantially increasing both the tack and green strength of synthetic polyisoprene.

EXAMPLE II

In order to evaluate the effect of the invention on fully compounded stocks, the masterbatches of Example I are further mixed with 2.5 parts of sulfur and 0.5 part of an accelerator (N-oxydiethylene-2-benzothiazole sulfenamide) by weight per 100 parts of rubber. Test results are set forth in Table II.

The data in Table II show that the effectiveness carries through in completely compounded stocks in the same manner as with the masterbatches. Slightly better tack and green strength properties result in the stocks treated according to the method of the invention as compared with the control (Stock 1).

EXAMPLE III

The methods and compositions of the invention are evaluated in different polymer systems. An all natural rubber masterbatch and a 50/50 blend of natural rubber and polybutadiene are prepared, using SMR 5-CV natural rubber and Cis-4 1203 polybutadiene. Different levels of sodium formaldehyde sulfoxylate are used, and the compounds are prepared and tested as in Example I. The formulations and results are set forth in Table III. Similar trends are noticed, except that the tack is actually lessened for the natural/BR blends.

TABLE II

| Stock | 1 | 2 | 3 | 4 |
|---|---|---|---|---|
| Masterbatch A | 164.0 | — | — | — |
| B | — | 164.8 | — | — |
| C | — | — | 165.0 | — |
| D | — | — | — | 165.0 |
| Sulfur | 2.5 | → | → | → |
| Accelerator | 0.5 | → | → | → |
| Green Strength @ R.T., MPa Stress At: | | | | |
| 100% | 0.24 | 0.32 | 0.33 | 0.39 |
| 300% | 0.16 | 0.33 | 0.30 | 0.53 |
| 400% | 0.14 | 0.41 | 0.33 | 0.74 |
| U.E., % | >1200 | 670 | 860 | 590 |
| Tack, Monsanto Tel-Tak | | | | |
| Tack | 43 | 54 | 54 | 67 |
| Stickiness | 11 | 10 | 11 | 11 |
| "True" Tack | 32 | 44 | 43 | 56 |

TABLE III

| Masterbatch | E | F | G | H | I | J |
|---|---|---|---|---|---|---|
| Polymer | | | | | | |
| Natural Rubber-SMR5-CV | 100.0 | → | → | 50.0 | → | → |
| Polybutadiene-cis-4 1203 | — | — | — | 50.0 | → | → |
| Test Compound | | | | | | |
| Sodium Formaldehyde Sulfoxylate | — | 1.0 | 2.0 | — | 1.0 | 2.0 |
| Other Ingredients | | | | | | |
| N-330 Carbon Black | 50.0 | → | → | → | → | → |
| Circosol 4240 Oil | 5.0 | → | → | → | → | → |
| Zinc Oxide | 5.0 | → | → | → | → | → |
| Stearic Acid | 2.0 | → | → | → | → | → |
| Antidegradant | 2.0 | → | → | → | → | → |
| Green Strength @ R.T., MPa Stress At: | | | | | | |
| 100% | 0.41 | 0.45 | 0.46 | 0.35 | 0.40 | 0.41 |
| 300% | 0.72 | 0.93 | 1.10 | 0.37 | 0.48 | 0.53 |
| 400% | 1.26 | 1.68 | 2.10 | 0.44 | 0.65 | 0.75 |
| U.E., % | 470 | 440 | 417 | 700 | 630 | 620 |
| Tack, Monsanto Tel-Tak | | | | | | |
| Tack | 53 | 54 | 64 | 44 | 34 | 27 |
| Stickiness | 13 | 14 | 13 | 13 | 14 | 13 |
| "True" Tack | 40 | 40 | 51 | 31 | 20 | 14 |

TABLE IV

| Masterbatch | K | L | M | N | O | P | Q |
|---|---|---|---|---|---|---|---|
| Polymer | | | | | | | |
| Natural Rubber-SMR5-CV | 50.0 | → | → | — | — | — | — |
| SBR 1502 | 50.0 | → | → | 100.0 | → | → | → |
| Test Compound | | | | | | | |
| Sodium Formaldehyde Sulfoxylate | — | 1.0 | 2.0 | — | 1.0 | 2.0 | 3.0 |
| Other Ingredients | | | | | | | |
| N-660 Carbon Black | 60.0 | → | → | → | → | → | → |
| Circosol 4240 Oil | 10.0 | → | → | → | → | → | → |
| Zinc Oxide | 4.0 | → | → | → | → | → | → |
| Stearic Acid | 2.0 | → | → | → | → | → | → |
| Antidegradant | 2.0 | → | → | → | → | → | → |
| Green Strength @ R.T., MPa Stress At: | | | | | | | |
| 100% | 0.39 | 0.40 | 0.42 | 0.45 | 0.50 | 0.52 | 0.50 |
| 300% | 0.37 | 0.46 | 0.51 | 0.27 | 0.39 | 0.39 | 0.39 |
| 400% | 0.41 | 0.57 | 0.63 | 0.21 | 0.33 | — | 0.34 |
| U.E., % | 960 | 815 | 760 | 500 | 700 | 305 | 650 |
| Tack, Monsanto Tel-Tak | | | | | | | |
| Tack | 64 | 69 | 70 | 26 | 24 | 20 | 19 |
| Stickiness | 12 | 12 | 14 | 17 | 19 | 19 | 17 |

TABLE IV-continued

| Masterbatch | K | L | M | N | O | P | Q |
|---|---|---|---|---|---|---|---|
| "True" Tack | 52 | 57 | 56 | 9 | 6 | 1 | 2 |

EXAMPLE IV

In a manner similar to that of Example III, the invention is evaluated in all SBR polymer and 50/50 SBR/natural rubber masterbatches, using SMR 5-CV as before and SBR 1502. Again, different levels of sodium formaldehyde sulfoxylate are used. In this instance, N-660 carbon black is used, at the 60 phr level, and ten parts of oil and four parts of zinc oxide are used. The formulations and test results are set forth in Table IV. The all-SBR masterbatches are improved in green strength, but the normally low tack is worse, if any different.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising diene rubber containing a modifying amount of a salt of hydroxymethylsulfinic acid and also containing carbon black or a non-black filler selected from clay, talc, silica and calcium carbonate.

2. The composition of claim 1 wherein the salt is of a metal ion and is present in an amount of from 0.1 to 15 parts by weight per 100 parts of diene rubber by weight.

3. The composition of claim 2 wherein the salt is selected from alkali metal, calcium, magnesium and zinc salts of hydroxymethylsulfinc acid.

4. The composition of claim 3 wherein the salt is sodium formaldehyde sulfoxylate.

5. The composition of claim 4 wherein the diene rubber comprises polyisoprene.

6. The composition of claim 3 wherein the salt is present in an amount of from 0.25 to 8 parts by weight per 100 parts of diene rubber by weight.

7. The composition of claim 6 wherein the salt is sodium formaldehyde sulfoxylate.

8. The composition of claim 7 wherein the diene rubber comprises polyisoprene.

9. The composition of claim 2 wherein the salt is present in an amount of from 0.5 to 5 parts by weight per 100 parts of diene rubber by weight.

10. The composition of claim 9 wherein the salt is selected from alkali metal, calcium, magnesium and zinc salts of hydroxymethylsulfinic acid.

11. The composition of claim 10 wherein the salt is sodium formaldehyde sulfoxylate.

12. The composition of claim 11 wherein the diene rubber comprises polyisoprene.

13. The composition of claim 12 wherein the diene rubber comprises natural rubber.

14. The composition of claim 11 wherein the diene rubber comprises a polymer from 1,3-butadiene.

15. The method of treating diene rubber which comprises treating the diene rubber at an appropriate temperature above 130° C. for a long enough time to impart to the diene rubber improved properties as to green strength or tack with a salt of hydroxymethylsulfinic acid wherein carbon black or a non-black filler selected from clay, talc, silica and calcium carbonate is present with the diene rubber during the treating.

16. The method of claim 15 wherein the treatment is performed for from 0.1 to 20 minutes at a temperature of at least 150° C. and the salt is of a metal ion and is present in an amount of from 0.1 to 15 parts by weight per 100 parts of diene rubber by weight.

17. The method of claim 16 wherein the salt is selected from alkali metal, calcium, magnesium and zinc salts of hydroxymethylsulfinic acid.

18. The method of claim 17 wherein the salt is sodium formaldehyde sulfoxylate.

19. The method of claim 16 wherein the diene rubber comprises polyisoprene.

20. The method of claim 17 wherein the treatment is performed for from 0.5 to 15 minutes at a temperature of at least 160° C. and the salt is present in an amount of from 0.25 to 8 parts by weight per 100 parts of diene rubber by weight.

21. The method of claim 20 wherein the salt is sodium formaldehyde sulfoxylate.

22. The method of claim 21 wherein the diene rubber comprises polyisoprene.

23. The method of claim 15 wherein the treatment is performed for from 1 to 10 minutes at a temperature of from 160° to 210° C. and the salt is present in an amount of from 0.5 to 5 parts by weight per 100 parts of diene rubber by weight.

24. The method of claim 23 wherein the salt is selected from alkali metal, calcium, magnesium and zinc salts of hydroxymethylsulfinic acid.

25. The method of claim 24 wherein the salt is sodium formaldehyde sulfoxylate.

26. The method of claim 23 wherein the diene rubber comprises polyisoprene.

27. The method of claim 25 wherein the diene rubber comprises natural rubber.

28. The method of claim 25 wherein the diene rubber comprises a polymer from 1,3-butadiene.

29. The method of claim 25 wherein the polymer is polyisoprene and the treatment comprises mastication.

30. The method of claim 25 wherein the polymer is polyisoprene, and the additional step of adding from 10 to 1000 parts by weight of untreated diene rubber per 100 parts diene rubber by weight.

31. A composition comprising polyisoprene containing a modifying amount of a salt of hydroxymethylsulfinic acid.

32. The composition of claim 31 wherein the salt is sodium formaldehyde sulfoxylate.

33. The composition of claim 31 wherein the salt is present in an amount of from 0.1 to 15 parts per weight per 100 parts polyisoprene by weight.

34. The method of treating polyisoprene which comprises treating the polyisoprene at an appropriate temperature above 130° C. for a long enough time to impart to the polyisoprene improved properties as to green strength or tack with a salt of hydroxymethylsulfinic acid.

35. The method of claim 34 wherein the salt is sodium formaldehyde sulfoxylate.

36. The method of claim 34 wherein the treatment is performed for from 0.1 to 20 minutes at a temperature of at least 150° C. and the salt is present in an amount of from 0.1 to 15 parts by weight per 100 parts of polyisoprene by weight.

37. The method of claim 34 and the additional step of adding from 10 to 1000 parts by weight of untreated polyisoprene per 100 parts polyisoprene by weight.

* * * * *